United States Patent
Chhetri (10) Patent No.: US 9,521,249 B1
(45) Date of Patent: Dec. 13, 2016

(54) ECHO PATH CHANGE DETECTOR WITH ROBUSTNESS TO DOUBLE TALK

(71) Applicant: Amazon Technologies, Inc., Reno, NV (US)

(72) Inventor: Amit Singh Chhetri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/609,347

(22) Filed: Jan. 29, 2015

Related U.S. Application Data (63) Continuation of application No. 13/906,076, filed on May 30, 2013, now Pat. No. 8,953,777.

(51) Int. Cl.
*H04M 3/00* (2006.01)
*H04M 1/60* (2006.01)
*H04B 3/23* (2006.01)
*H04M 9/08* (2006.01)

(52) U.S. Cl.
CPC .......... *H04M 3/002* (2013.01); *H04M 1/6041* (2013.01); *H04B 3/234* (2013.01); *H04M 9/082* (2013.01)

(58) Field of Classification Search
None
See application file for complete search history.

(56) References Cited

U.S. PATENT DOCUMENTS

| | | | | |
|---|---|---|---|---|
| 6,226,380 B1* | 5/2001 | Ding | ........................ | H04B 3/23 379/413.01 |
| 6,687,723 B1* | 2/2004 | Ding | .................. | H03H 21/0012 708/322 |
| 2004/0086109 A1* | 5/2004 | Takada | .................... | H04B 3/234 379/406.08 |
| 2007/0286404 A1* | 12/2007 | Popovic | ................. | H04B 3/237 379/406.01 |
| 2012/0237018 A1 | 9/2012 | Barron et al. | | |
| 2013/0322638 A1 | 12/2013 | Lee et al. | | |
| 2015/0124986 A1* | 5/2015 | Li | ............................. | H04B 3/23 381/66 |

OTHER PUBLICATIONS

Iqbal, et al.: "A Novel Normalized Cross-Correlation Based Echo-Path Change Detector," University of Missouri-Rolla, Rolla, MO, 2007.

* cited by examiner

*Primary Examiner* — Fan Tsang
*Assistant Examiner* — Jeffrey Lytle
(74) *Attorney, Agent, or Firm* — Knobbe Martens Olson & Bear, LLP (57) ABSTRACT

An echo path change detector may be used to control the rate of adaptation in an acoustic echo canceller. When echo path change is declared, the rate of adaptation may be increased. However, echo path change should not be declared in the presence of double talk, because rapid adaptation during double talk is undesirable. Accordingly, various features are disclosed for detecting echo path changes while avoiding the declaration of such changes in the presence of double talk.

17 Claims, 4 Drawing Sheets

ECHO PATH CHANGE DETECTOR WITH ROBUSTNESS TO DOUBLE TALK

RELATED APPLICATIONS

This application claims priority to and is a continuation of U.S. application Ser. No. 13/906,076, filed May 30, 2013, which is hereby incorporated by reference.

BACKGROUND

A device for bi-directional audio-based communication typically includes both a loudspeaker and a microphone. The loudspeaker is used to play back audio signals received from a remote ("far-end") source, while the microphone is used to capture audio signals from a local ("near-end") source. In the case of a telephone call, for example, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller (AEC) may be used to remove acoustic echo from an audio signal captured by a microphone, in order to facilitate improved communication. The AEC typically filters the microphone signal by determining an estimate of the acoustic echo, and subtracting the estimate from the microphone signal to produce an approximation of the true near-end signal. The estimate is obtained by applying a transformation to the far-end signal emitted from the loudspeaker. The transformation is implemented using an adaptive algorithm such as least mean squares, normalized least mean squares, or their variants, which are known to persons of ordinary skill in the art.

The adaptive transformation relies on a feedback loop, which continuously adjusts a set of parameters that are used to calculate the estimated echo from the far-end signal. The adaptation functions more effectively in some situations than in others. For example, adaptation is most effective when the far-end signal is active (e.g., because a person on the far end is talking), and the near-end signal is inactive (e.g., because nobody on the near end is talking). In this situation, referred to as "receive single talk," the microphone signal will include only the acoustic echo. Therefore, the adaptive parameters can simply be adjusted until they yield an estimated echo that matches the actual echo present in the microphone signal. In this way, the feedback loop will cause the estimated echo to converge on the actual echo.

Adaptation is less effective in the situation referred to as "double talk," when the far-end signal and the near-end signal are both simultaneously active. In the presence of double talk, the microphone signal will include both the near-end signal and the acoustic echo. The AEC may be unable to adequately distinguish between the different components of the microphone signal. Accordingly, if the feedback loop continues during double talk, the estimated echo may diverge from the actual echo, and the AEC may no longer cancel the acoustic echo satisfactorily. In order to prevent such divergence, AECs typically rely on double-talk detectors, which may be used to decrease the rate of adaptation or stop it altogether during periods of double talk.

In some situations, it may be useful to increase the rate of adaptation beyond the normal level. For example, when the communication device changes position relative to objects or people in the local environment, the reflections that produce the acoustic echo may change as well. This is referred to as an echo path change. When an echo path change occurs, the estimated echo produced by the AEC may no longer provide a good approximation of the actual acoustic echo. The AEC's adaptive parameters will eventually be updated by the feedback loop, but until then the quality of the AEC output will be diminished. Therefore, AECs typically rely on echo path change detectors (EPCDs), which may be used to temporarily increase the rate of adaptation.

As described above, AECs are typically configured to slow adaptation during double talk and speed adaptation during echo path changes. These adaptation strategies are mutually incompatible, so a conflict may arise when double talk and echo path changes occur simultaneously. Such conflict can be resolved by giving precedence to double talk over echo path changes, so that adaptation is slowed or halted when both occur at the same time. An AEC may be configured to implement such precedence by selectively disregarding the output of an EPCD based on the output of a double talk detector. It may be preferable, however, to configure the EPCD so that echo path changes are not detected at all during double talk. This way, echo path change and double talk will never be detected together, and the proper adaptation strategy can be easily determined in any given circumstance.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to avoiding detection of echo path changes during double talk, while maintaining effective detection of echo path changes in other circumstances. This is accomplished by calculating four different quantities and comparing the calculated quantities with predefined thresholds. When all four quantities exceed their respective thresholds, an echo path change is detected. An EPCD that is implemented in accordance with this disclosure can be combined with a double talk detector in a straightforward manner, based on the assumption that echo path changes and double talk will not be detected simultaneously.

Figure 1:
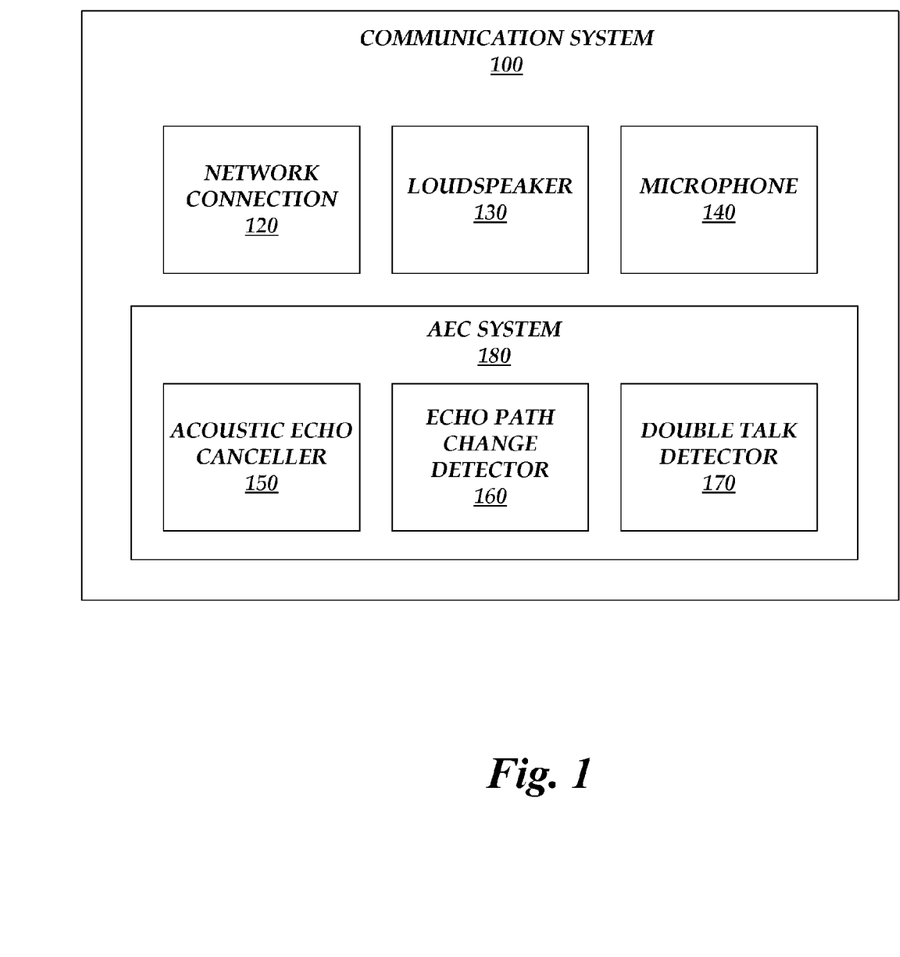
FIG. 1 is a block diagram illustrating components of some communication systems that include acoustic echo cancellers.

FIG. 1 shows an example of a communication system 100. Communication system 100 may be implemented in hardware and/or software using techniques known to persons of skill in the art. For example, communication system 100 may be implemented by a single telecommunication device, such as a mobile phone, or by a combination of several devices such as a mobile computing device and a network-accessible server.

FIG. 1 shows components that may appear in communication system 100, including a network connection 120, a loudspeaker 130, a microphone 140, an acoustic echo canceller 150, an echo path change detector 160 and a double talk detector 170. The last three of these components are each a part of AEC system 180.

Network connection 120 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 120 may include a far-end signal, which may be emitted from loudspeaker 130, and an AEC output signal, produced by acoustic echo canceller 150. The AEC output signal may be determined by adaptively filtering a signal from microphone 140. For the sake of clarity, microphone 140 is referred to herein as a single component. However, in some embodiments, multiple microphones may be used together and an AEC system may be provided for each one. In AEC system 180, the rate of adaptation for acoustic echo canceller 150 may be controlled by echo path change detector 160 and double talk detector 170. Specific aspects of echo path change detector 160 are described below, with respect to FIGS. 2, 3, and 4.

Figure 2:
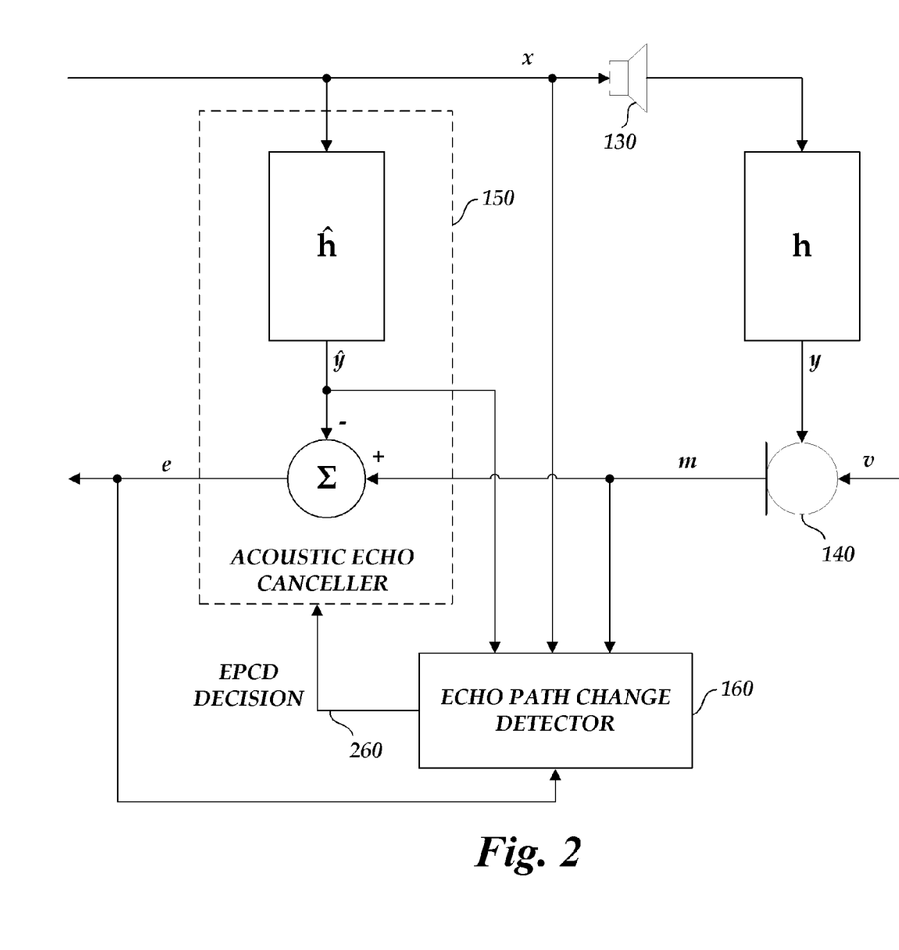
FIG. 2 is a signal diagram depicting the relationships between various signals that are used to detect echo path changes and implement acoustic echo cancellation.

FIG. 2 is a signal diagram that illustrates the relationships between various signals and components that are relevant to the detection of echo path changes. Various components of FIG. 2 correspond to components from FIG. 1, and retain the same numbering. These components include loudspeaker 130, microphone 140, acoustic echo canceller 150, and echo path change detector 160. The signals depicted in FIG. 2 include far-end signal x, acoustic echo y, near-end signal v, microphone signal m, estimated echo $\hat{y}$), AEC output e, and EPCD decision 260. FIG. 2 also depicts acoustic transfer function h and estimated acoustic transfer function $\hat{h}$.

In the example of FIG. 2, acoustic echo may occur as follows. Far-end signal x is emitted from loudspeaker 130 and undergoes various reflections in the local environment according to acoustic transfer function h, yielding acoustic echo y. Microphone 140 captures both acoustic echo y and near-end signal v, which together produce microphone signal m. The presence of acoustic echo y in microphone signal m may interfere with the recognition of near-end signal v by a listener, thereby hindering communication. Accordingly, it may be desirable to filter microphone signal m in order to remove acoustic echo y, to the extent that such removal is possible.

AEC 150 may be configured to filter microphone signal m in the following manner. First, AEC 150 applies estimated transfer function $\hat{h}$ to far-end signal x, yielding estimated echo $\hat{y}$. Estimated echo $\hat{y}$ is subtracted from microphone signal m, producing AEC output e. AEC output e is an estimate of the near-end signal v, and if AEC 150 is functioning properly then the content of near-end signal v will be more easily discerned from AEC output e than from microphone signal m.

As described above, AEC 150 relies on estimated echo $\hat{y}$, which in turn relies on estimated transfer function $\hat{h}$. The estimation of transfer function $\hat{h}$ is adaptive, meaning that the parameters of the transfer function are adjusted automatically. The rate of adaptation is variable, and an example process for controlling the rate of adaptation is described below with respect to FIG. 4. For present purposes, it is sufficient to note that the rate of adaptation may be increased when an echo path change is detected. Echo path changes may be ascertained on the basis of EPCD decision 260, which AEC 150 receives from EPCD 160.

EPCD 160 determines EPCD decision 260 by performing various calculations, which are described below with respect to FIG. 3. The inputs to these calculations are microphone signal m, far-end signal x, estimated echo $\hat{y}$, and AEC output e.

The AEC 150 and EPCD 160 modules process the signals on a frame-by-frame basis. Here, a frame represents a collection of discrete signal samples (in the correct sequence) and is typically 8-10 milliseconds long. For each frame, the signal samples of the frame are processed sequentially to compute various signal statistics, and once the end of the frame is reached, these statistics are used to obtain the EPCD output. The signal samples are indexed by discrete sample index n, with each sample representing the state of the signal at a particular point in time. Thus, for example, the signal e may be represented by a sequence of samples e(0), e(1), . . . e(n). In this example the index n corresponds to the most recent point in time for which a sample is available. In addition, calculations involving various signals may be expressed using the sample index n. For example, the value of e at time n may be determined by the equation e(n)=m(n)−$\hat{y}$(n).

In some cases, the value of one signal at time n may depend on values of one or more other signals at several points in time. For example, that the value of estimated echo $\hat{y}$ depends on the value of the far-end signal x, as follows:

$$\hat{y}(n)=\hat{h}(n)*x(n),$$

where '*' denotes the convolution operation. The value of the estimated transfer function $\hat{h}(n)$ at time n may be defined to depend on the value of the input signal at several points in time. Using x as the input signal, the value of the convolution of $\hat{h}$ and x at time n may be calculated this way:

$$\hat{h}(n)*x(n)=\hat{h}_0(n)\times(n)+\hat{h}_1(n)\times(n-1)+ \ldots +\hat{h}_L(n)\times(n-L)$$

Combining the last two equations, it can be seen that the value of 5) at time n depends on the value of x at times n, n−1, . . . , n−L:

$$\hat{y}(n)=\hat{h}_0(n)\times(n)+\hat{h}_1(n)\times(n-1)+ \ldots +\hat{h}_L(n)\times(n-L)$$

Thus, the value of a particular signal at one point in time may be calculated from values of other signals at multiple points in time.

Note that in the foregoing example, the estimated transfer function ĥ is defined by a set of coefficients $\hat{h}_0, \hat{h}_1, \ldots, \hat{h}_L$. These coefficients are the adaptive parameters of the AEC, which are adjusted continuously in order to make the estimated echo ŷ converge on the actual echo y. The calculation of ŷ depends on values of the far-end signal x at several different points in time because the actual echo y may be caused by reflections of x along multiple paths in the local environment. Some of these paths will be longer than others, and the time required for sound to traverse them will vary accordingly. The acoustic echo y that reaches the microphone at a particular time will therefore correspond to values of x from multiple points in time. The calculation of ŷ is designed to account for this fact, which is why ŷ(n) depends on x(n), x(n-1), . . . x(n-L).

Figure 3:
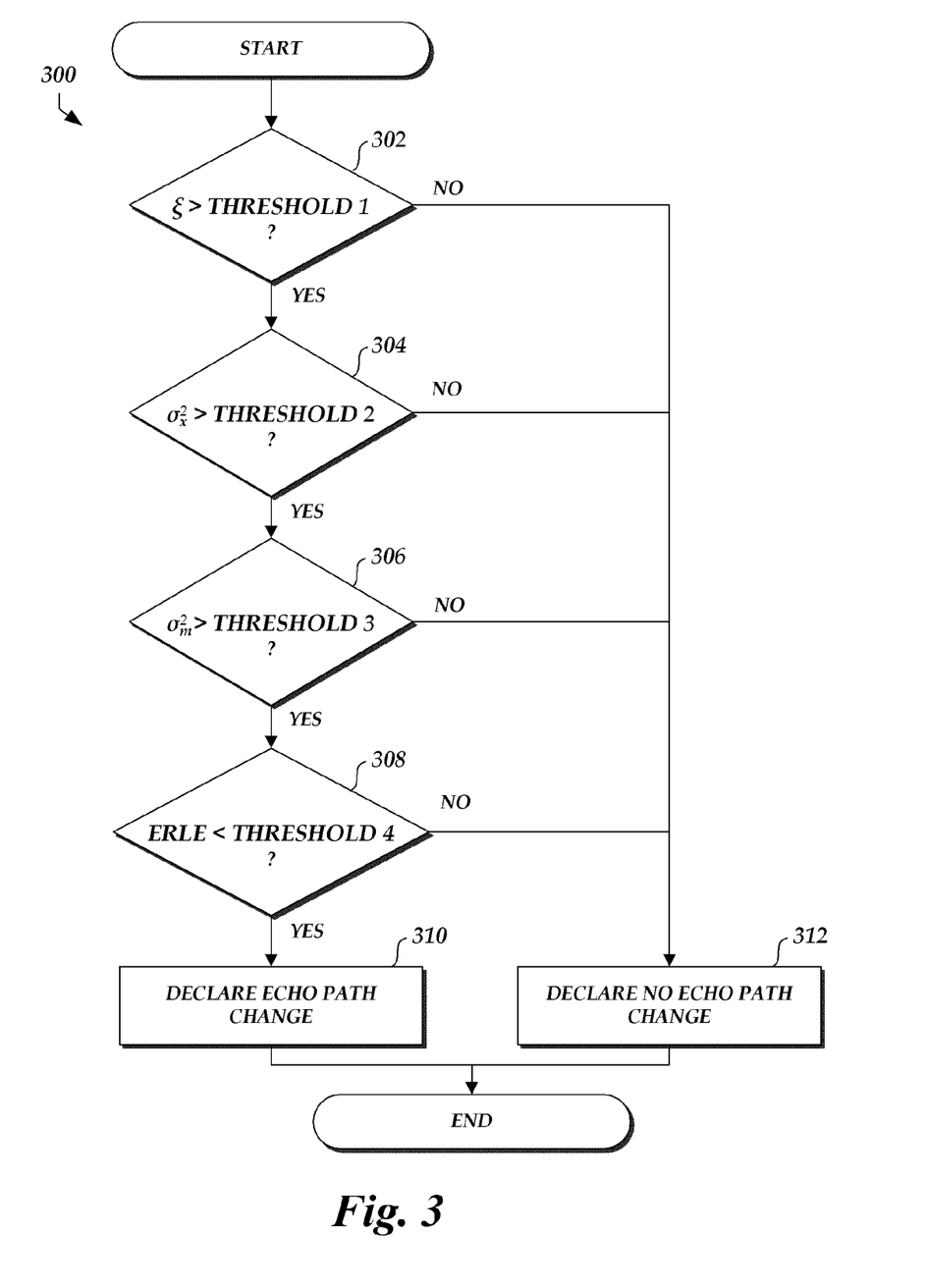
FIG. 3 is a flow diagram of an illustrative process for detecting echo path changes according to aspects of the present disclosure.

Turning now to FIG. 3, an example process 300 for detecting echo path change is depicted. This process may be used, for example, with EPCD 160 of FIG. 2. Advantageously, process 300 will avoid detecting echo path changes in the presence of double talk. This advantageous feature prevents conflicts between EPCD 160 and double talk detector 170, allowing the adaptation rate in AEC 150 to be controlled without unnecessary complexity.

Process 300 relies on several statistics, which are determined from the input signals identified in FIG. 2, including m, x, ŷ, and e. Each statistic is compared to a predetermined threshold, as shown in blocks 302, 304, 306, and 308 of FIG. 3. Each threshold is tuned empirically, and may vary between platforms. Example ranges for each threshold are:

Threshold 1~[0.05, 0.15]
Threshold 2~[1e-6, 1e-5]
Threshold 3~[1e-6, 1e-5]
Threshold 4~[15, 30]

If the comparison criteria are met with respect to all four of the thresholds, the EPCD will declare that an echo path change has occurred, as shown in block 310. If any of the comparison criteria are not met, then the EPCD will declare that no echo path change has occurred, as shown in block 312.

The first statistic required by process 300 may be referred to as the EPCD statistic. As shown in block 302, the EPCD statistic is represented by ξ. In one embodiment:

$$\xi = \left| \frac{r_{em} - \sigma_e^2}{\alpha \sigma_{est}^2 + (1-\alpha)\sigma_m^2} \right|$$

Based on this equation, calculating ξ requires the terms $r_{em}$, $\sigma_e^2$, $\sigma_{est}^2$, $\sigma_m^2$, and α. The first term, $r_{em}$, corresponds to the cross-correlation between the AEC output signal e and the microphone signal m. In practice, the cross-correlation may be determined by first-order recursive estimation, on a sample-by-sample basis, as follows:

$$r_{em}(n) = \beta_1 r_{em}(n-1) + (1-\beta_1)e(n)m(n)$$

The next three terms, $\sigma_e^2$, $\sigma_{est}^2$, and $\sigma_m^2$, correspond to the variances of the AEC output signal, echo estimate signal, and microphone signal, respectively. Note that since the signals we are dealing are presumed to have zero mean, the variance of the signal is also equal to its mean square energy. Thus, in the following, the terms $\sigma_e^2$, $\sigma_{est}^2$, and $\sigma_m^2$ denote the AEC output signal energy, echo estimate signal energy, and the microphone signal energy. These may also be calculated by first-order recursive estimation:

$$\sigma_m^2(n) = \beta_2 \sigma_m^2(n-1) + (1-\beta_2)m^2(n)$$

$$\sigma_e^2(n) = \beta_3 \sigma_e^2(n-1) + (1-\beta_3)e^2(n)$$

$$\sigma_{est}^2(n) = \beta_4 \sigma_{est}^2(n-1) + (1-\beta_4)\hat{y}^2(n)$$

In all four of these recursive estimation equations, n denotes the sample index and the coefficients $\beta_i$ are smoothing factors in the range [0,1].

The final term required to calculate the EPCD statistic is the tuning parameter α, which determines the relative weight of the echo estimate energy and the microphone energy in the denominator. The value of α may be determined experimentally for a particular communication platform, and will fall within the range [0,1]. The terms α and (1-α) may both be referred to as fractions, because both will be less than one.

As explained earlier, it is desirable to avoid detection of echo path change during double talk in order to avoid mutually incompatible decisions on the adaptive filter stepsize by the EPCD and the double talk detector. Further, when echo path change and double talk occur simultaneously, the EPCD should not declare that echo path change has occurred since increasing the step-size during double talk would lead to instability of the AEC adaptive filter. Because process 300 is designed to detected echo path change only when the EPCD statistic exceeds a threshold, the detection of echo path change can be avoided by ensuring that the EPCD statistic does not exceed this threshold during double talk, but rather that the EPCD statistic exceeds this threshold when only echo path change has occurred. Referring to the EPCD statistic ξ described above, the use of the microphone signal energy (in addition to the echo estimate energy) in the denominator ensures that the EPCD statistic does not exceed the EPCD threshold during double talk, and thereby avoids misdetecting double talk as echo path change. In addition, the use of echo estimate energy directly in the denominator has the additional advantage of preventing numerical errors that would arise if it was computed indirectly.

Process 300 adds additional accuracy to the detection of echo path changes by relying on three additional statistics. Specifically, after the EPCD statistic is compared to the first threshold at block 302, the process continues to blocks 304, 306, and 308. At block 304, the far-end signal energy $\sigma_x^2$ is compared to a second threshold. This comparison ensures that the far-end signal is active. This is useful because there will be no echo, and thus no detectable echo path changes, without an active far-end signal. The far-end signal energy may be determined by first-order recursive averaging as follows:

$$\sigma_x^2(n) = \beta_5 \sigma_x^2(n-1) + (1-\beta_5)x^2(n)$$

Again, n denotes the sample index and the coefficient $\beta_5$ is a smoothing factor in the range [0,1].

Continuing at block 306, the microphone signal energy a is compared to a third threshold. This comparison ensures that the microphone is capturing a signal with enough energy for echo path changes to be accurately detected. The microphone energy may be calculated using the equation that was introduced above, during the discussion of the EPCD statistic.

At block 308, a quantity referred to as echo return loss enhancement (ERLE) is calculated, and compared to a fourth threshold. In contrast to the previous three comparisons, the comparison at block 308 determines whether the ERLE statistic is below the relevant threshold, rather than above it. In general, ERLE used to measure how much echo cancellation has occurred during receive single talk. In the present context, it is used to ensure that echo path change is not detected when the AEC is performing sufficiently well.

It is also useful for avoiding pitfalls that may result from the interaction of numerical terms in the EPCD statistic defined above. ERLE may be calculated according to the following equation:

$$ERLE = \left|\frac{\sigma_m^2}{\sigma_e^2}\right|$$

In the present context, ERLE is measured continuously, regardless of whether the true underlying condition is single talk or double talk.

If the comparison criteria on all the four statistics with respect to their respective thresholds are met at blocks 302-308, process 300 will continue to block 310 where echo path change is declared. If at least one of the four comparison criteria is not met, then the process continues to block 312 where the EPCD declares that no echo path change has occurred. Together, the calculations and comparisons of process 300 ensure that echo path changes are only declared in the absence of double talk.

Figure 4:
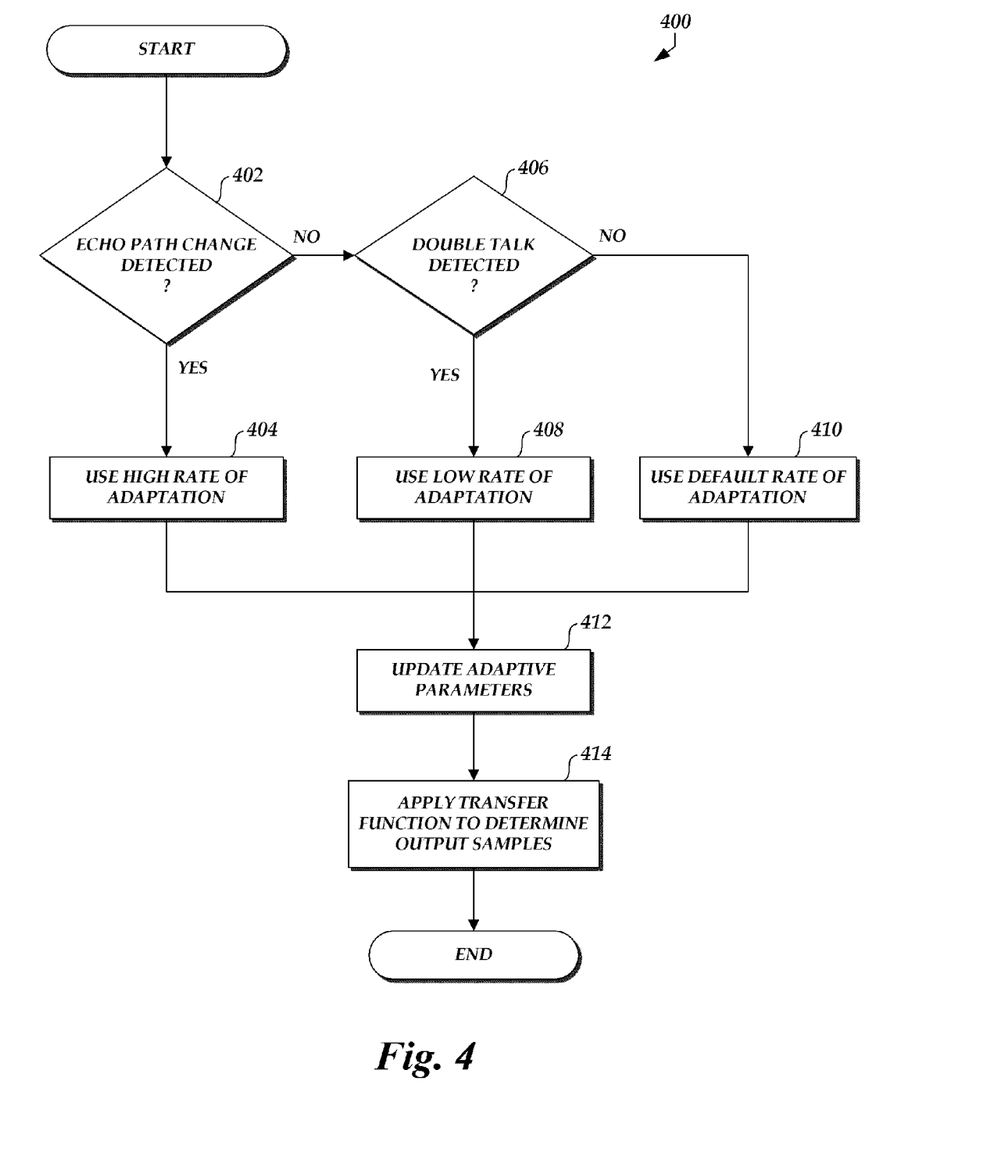
FIG. 4 is a flow diagram of an illustrative process for controlling adaptation in an acoustic echo canceller based on detection of echo path changes and double talk.

FIG. 4 depicts an example process 400 for controlling the rate of adaptation in an AEC, based on information provided by an EPCD and a double talk detector. Process 400 may be implemented, e.g., by AEC 150, using decisions from EPCD 160 and double talk detector 170, and based on the signals and functions of FIG. 2. Separate iterations of process 400 may be performed on a frame-by-frame basis, yielding an adaptation rate and resulting transfer function for each frame. Alternatively, separate iterations of process 400 may be performed sample-by-sample. In keeping with beneficial aspects of this disclosure, process 400 is easy to implement because it assumes that echo path changes will not be declared during double talk.

Process 400 begins at block 402, where a decision is received from the EPCD. If echo path change is detected, the process continues to block 404, where the AEC selects a high rate of adaptation. Alternatively, if no echo path change is detected, process 400 continues to block 406, where a decision is received from the double talk detector. If double talk is detected, the process continues to block 408, where the AEC selects a low rate of adaptation. If neither echo path change nor double talk is detected, then process 400 continues to block 410 and the AEC uses a default rate of adaptation. In some embodiments, the default rate of adaptation may be static, while in other embodiments it may be continuously adjusted based on the values of one or more input signals. Regardless of whether the default rate of adaptation is static or dynamic, though, the detection of echo path change will make the rate higher than the default, and the detection of double talk will make the rate lower.

Once the rate of adaptation is determined, process 400 continues to block 412, where the adaptive parameters of the AEC are updated. An increased rate of adaptation may result in more substantial adjustments to the parameters during each iteration of process 400, while a decreased rate of adaptation may result in less substantial adjustments. After the parameters are updated, process 400 continues to block 414, where the AEC applies a transfer function using the current values of the adaptive parameters, in order to determine output samples for the current frame. For example, the AEC may apply the estimated transfer function $\hat{h}$ using the coefficients $\hat{h}_0, \hat{h}_1, \ldots, \hat{h}_L$ to determine a current output sample e(n) from the estimated echo sample ŷ(n) and the current microphone sample m(n). In other words, e(n) may be determined by the equations:

$$e(n) = m(n) - \hat{y}(n)$$

$$\hat{y}(n) = \hat{h}_0(n) \times (n) + \hat{h}_1(n) \times (n-1) + \ldots + \hat{h}_L(n) \times (n-L)$$

After block 414, process 400 is complete.

As successive iterations of process 400 are performed, output frames are produced by AEC 150. Advantageously, in accordance with the foregoing disclosure, the resulting AEC output signal will be unlikely to diverge, even in the presence of double-talk.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An acoustic echo cancellation device, comprising:
   a loudspeaker configured to generate a first signal;
   a microphone configured to generate a second signal;
   an acoustic echo canceller configured to generate a third signal characterizing an acoustic echo canceller output energy and a fourth signal characterizing an estimated echo energy, the acoustic echo canceller further configured to determine a first statistic characterizing an echo return loss enhancement from the second signal and the third signal;
   an echo path change detector configured to:
      determine a first product by multiplying the fourth signal with a first coefficient;
      determine a second product by multiplying the second signal with a second coefficient;
      determine a ratio of a first value divided by a sum of the first product and the second product; and
      determine a second statistic characterizing an echo path change from the third signal, the fourth signal, the second signal, and the ratio; and
   a processor configured to:
      determine that the second statistic is above a first threshold;
      determine that the first signal is above a second threshold;
      determine that the second signal is above a third threshold;
      determine that the first statistic is below a fourth threshold; and
      determine that an echo path change has occurred.

2. The device of claim 1, wherein the first statistic comprises the second signal divided by the third signal.

3. The device of claim 1, wherein the processor is further configured to increase a rate of adaptation of a set of parameters used by the acoustic echo canceller to calculate the fourth signal.

4. The device of claim 3, wherein the processor is further configured to increase the rate of adaptation without reference to an output from a double talk detector.

5. The device of claim 1, wherein the microphone is configured to receive a near end signal and an acoustic echo generated by the loudspeaker from the first signal.

6. The device of claim 1, wherein the first coefficient is determined from a tunable parameter, and wherein the first coefficient and the second coefficient add up to 1.

7. The device of claim 1, wherein to compute the first value, the echo path change detector is further configured to:
   determine a cross-correlation between the third signal and the second signal, and
   calculate a difference between the cross-correlation and the third signal.

8. The device of claim 1, wherein the echo path change detector is further configured to:
   determine a cross-correlation between the third signal and the second signal,
   calculate a difference between the cross-correlation and the third signal, and
   determine the second statistic using the difference.

9. A method comprising:
   generating a third signal characterizing an acoustic echo canceller output energy and a fourth signal characterizing an estimated echo energy;
   determining a first statistic characterizing an echo return loss enhancement from a second signal generated by a microphone and the third signal;
   determining a first product by multiplying the fourth signal with a first coefficient;
   determining a second product by multiplying the second signal with a second coefficient;
   determining a ratio of a first value divided by a sum of the first product and the second product;
   determining a second statistic characterizing an echo path change from the third signal, the fourth signal, the second signal, and the ratio;
   determining that the second statistic is above a first threshold;
   determining that a first signal generated by a loudspeaker is above a second threshold;
   determining that the second signal is above a third threshold;
   determining that the first statistic is below a fourth threshold; and
   determining that an echo path change has occurred.

10. The method of claim 9, further comprising determining the first statistic by dividing the second signal by the third signal.

11. The method of claim 9, further comprising increasing a rate of adaptation of a set of parameters used by the acoustic echo canceller to calculate the fourth signal upon determining that the echo path change has occurred.

12. The method of claim 9, further comprising increasing a rate of adaptation without reference to any output from a double talk detector.

13. The method of claim 9, wherein the first coefficient is determined from a tunable parameter, and wherein the first coefficient and the second coefficient add up to 1.

14. The method of claim 9, wherein determining the second statistic further comprises:
   determining a cross-correlation between the third signal and the second signal, and
   calculating a difference between the cross-correlation and the third signal, wherein the first value is computed using the difference.

15. A system, comprising:
means for generating a third signal characterizing an acoustic echo canceller output energy;
means for generating a fourth signal characterizing an estimated echo energy;
means for determining a first statistic characterizing an echo return loss enhancement from a second signal generated by a microphone and the third signal;
means for determining a first product by multiplying the fourth signal with a first coefficient;
means for determining a second product by multiplying the second signal with a second coefficient;
means for determining a ratio of a first value divided by a sum of the first product and the second product;
means for determining a second statistic characterizing an echo path change from the third signal, the fourth signal, the second signal, and the ratio;
means for determining that the second statistic is above a first threshold;
means for determining that a first signal generated by a loudspeaker is above a second threshold;
means for determining that the second signal is above a third threshold;
means for determining that the first statistic is below a fourth threshold; and
means for determining that an echo path change has occurred.

16. The system of claim 15, wherein the means for determining the first statistic comprises dividing the second signal by the third signal.

17. The system of claim 15, further comprising means for increasing a rate of adaptation of a set of parameters used by the means for generating an third signal to calculate the fourth signal upon determining that the echo path change has occurred.

* * * * *